(12) United States Patent
Bai et al.

(10) Patent No.: US 11,265,221 B2
(45) Date of Patent: Mar. 1, 2022

(54) NETWORK RESOURCE ALLOCATION METHOD AND APPARATUS

(71) Applicant: Huawei Technologies Co., Ltd., Shenzhen (CN)

(72) Inventors: Yuanling Bai, Shenzhen (CN); Weiping Xu, Dongguan (CN); Xiangtong Qi, Hong Kong (CN); Jing Ren, Sichuan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/120,904

(22) Filed: Dec. 14, 2020

(65) Prior Publication Data

US 2021/0099352 A1   Apr. 1, 2021

Related U.S. Application Data

(63) Continuation of application No. PCT/CN2019/076831, filed on Mar. 4, 2019.

(30) Foreign Application Priority Data

Jun. 15, 2018  (CN) .......................... 201810617515.4

(51) Int. Cl.
   *H04L 12/24*  (2006.01)
   *H04L 12/911*  (2013.01)
   (Continued)

(52) U.S. Cl.
   CPC ...... *H04L 41/0896* (2013.01); *H04L 41/5009* (2013.01); *H04L 47/822* (2013.01); *H04L 47/828* (2013.01)

(58) Field of Classification Search
   CPC ............ H04L 41/0896; H04L 41/5009; H04L 47/822; H04L 47/828
   See application file for complete search history.

(56) References Cited

U.S. PATENT DOCUMENTS 7,328,026 B2   2/2008  Gu et al.
9,455,927 B1   9/2016  Nayak et al.
(Continued)

FOREIGN PATENT DOCUMENTS

CN    101374020 A    2/2009
CN    104392273 A    3/2015
(Continued)

*Primary Examiner* — Tonia L Dollinger
*Assistant Examiner* — Jihad K Boustany
(74) *Attorney, Agent, or Firm* — Slater Matsil, LLP

(57) ABSTRACT

A method is performed by a control device, and the method includes: obtaining a first request and a second request, where the first request includes a bandwidth required by a first service, the second request includes a bandwidth required by a second service; determining the bandwidth required by the first service, and the bandwidth required by the second service, that a bandwidth occupation conflict exists between the first request and the second request; obtaining a plurality of comprehensive allocation modes for the first service and the second service based on the bandwidth provided by the port, the bandwidth required by the first service, and the bandwidth required by the second service; and determining a preferred comprehensive allocation mode from the plurality of comprehensive allocation modes based on a bandwidth allocation policy group including a plurality of bandwidth allocation policies.

19 Claims, 4 Drawing Sheets

(51) Int. Cl.
*H04L 41/0896* (2022.01)
*H04L 41/5009* (2022.01)
*H04L 47/70* (2022.01)

(56) References Cited

U.S. PATENT DOCUMENTS

| | | |
|---|---|---|
| 9,608,917 B1 | 3/2017 | Anderson et al. |
| 2007/0180119 A1* | 8/2007 | Khivesara ............. H04L 47/828 709/226 |
| 2008/0247314 A1 | 10/2008 | Kim et al. |
| 2015/0249623 A1* | 9/2015 | Phillips .................. H04L 47/74 709/219 |
| 2016/0301617 A1* | 10/2016 | Peterson ................ H04L 47/52 |

FOREIGN PATENT DOCUMENTS

| | | |
|---|---|---|
| CN | 104915742 A | 9/2015 |
| CN | 105430752 A | 3/2016 |
| CN | 105516242 A | 4/2016 |
| CN | 105591769 A | 5/2016 |
| CN | 105721350 A | 6/2016 |
| CN | 106685624 A | 5/2017 |
| WO | 2017105452 A1 | 6/2017 |

* cited by examiner

NETWORK RESOURCE ALLOCATION METHOD AND APPARATUS

CROSS-REFERENCE TO RELATED APPLICATIONS

This application a continuation of International Application No. PCT/CN2019/076831, filed on Mar. 4, 2019, which claims priority to Chinese Patent Application No. 201810617515.4, filed on Jun. 15, 2018. The disclosures of the aforementioned applications are hereby incorporated by reference in their entireties.

TECHNICAL FIELD

This application relates to the communications field, and in particular, to a network resource allocation method and an apparatus.

BACKGROUND

An intent-based networking solution includes: A network administrator obtains an intent request from a user. The intent request is used to represent a bandwidth that needs to be obtained by the user. The intent request may include the required bandwidth. The network administrator converts the intent request into a network configuration required for completing the intent request. The network administrator verifies correctness of the network configuration required for completing the intent request. The network administrator delivers a network configuration that passes correctness verification to a corresponding network device.

When a plurality of intent requests are obtained by the network administrator, and bandwidths for satisfying the plurality of intent requests cannot be simultaneously satisfied, a bandwidth occupation conflict exists between the plurality of intent requests. The bandwidth occupation conflict between the plurality of intent requests includes the following two types: A first type is that a conflict exists between a plurality of to-be-processed intent requests, and a second type is that a conflict exists between a to-be-processed intent request and a processed intent request. The conflict indicates that a bandwidth required by a specific intent request cannot be satisfied. When the conflict exists between the plurality of intent requests, the bandwidth cannot be properly planned. As a result, bandwidth usage is low, and a network status deteriorates and even congestion occurs.

SUMMARY

Embodiments of this application provide a network resource allocation method, to help improve bandwidth usage and reduce network congestion.

According to a first aspect, a network resource allocation method is provided, including: A control device obtains a first request and a second request, where the first request includes a bandwidth required by a first service, the second request includes a bandwidth required by a second service, and the bandwidth required by the first service and the bandwidth required by the second service are provided by a same port. The control device determines, based on a bandwidth provided by a port, the bandwidth required by the first service, and the bandwidth required by the second service, that a bandwidth occupation conflict exists between the first request and the second request. The control device determines at least one first service allocation mode based on the bandwidth provided by the port and the bandwidth required by the first service. The control device determines at least one second service allocation mode based on the bandwidth provided by the port and the bandwidth required by the second service. The control device determines a plurality of comprehensive allocation modes for the first service and the second service based on the at least one first service allocation mode and the at least one second service allocation mode. The control device determines a policy violation degree for each of the comprehensive allocation modes based on a bandwidth allocation policy group including a plurality of bandwidth allocation policies, to obtain a plurality of policy violation degrees. The control device determines a preferred comprehensive allocation mode from the plurality of comprehensive allocation modes based on the plurality of policy violation degrees.

In the foregoing method, the control device may consider the plurality of bandwidth allocation policies included in the bandwidth allocation policy group when selecting the preferred comprehensive allocation mode, so that the determined preferred comprehensive allocation mode can more properly satisfy the plurality of bandwidth allocation policies. This improves bandwidth usage and reduces network congestion.

Any first service allocation mode in the at least one first service allocation mode is a bandwidth allocation mode determined based on the bandwidth required by the first service. Any second service allocation mode in the at least one second service allocation mode is a bandwidth allocation mode determined based on the bandwidth required by the second service. A quantity of allocation modes in a set of the at least one first service allocation mode and the at least one second service allocation mode is greater than or equal to 3. The comprehensive allocation mode is a bandwidth allocation mode used for the first service and the second service. The comprehensive allocation mode for the first service and the second service includes a first service allocation mode and a second service allocation mode. The policy violation degree is a sum of products of a quantity of violations of each bandwidth allocation policy in the plurality of bandwidth allocation policies obtained in one comprehensive allocation mode and a weight value of each bandwidth allocation policy. The policy violation degree is used to represent that the bandwidth allocation mode is optimized in a bandwidth allocation process.

In a possible design of the first aspect, that the control device determines a plurality of comprehensive allocation modes for the first service and the second service based on the at least one first service allocation mode and the at least one second service allocation mode includes: The control device selects, from the at least one first service allocation mode and the at least one second service allocation mode, an $i_1^{th}$ allocation mode, an $i_2^{th}$ allocation mode, and an $i_3^{th}$ allocation mode that satisfy Formula 1 and Formula 2, where the $i_1^{th}$ allocation mode, the $i_2^{th}$ allocation mode, and the $i_3^{th}$ allocation mode at least include one first service allocation mode and one second service allocation mode:

$$\Sigma_j X(k,j)=1 \qquad \text{Formula 1, and}$$

$$\Sigma_{k=1}^2 X(k,j)r(k,j) \le R \qquad \text{Formula 2}$$

$\Sigma_j X(k, j)=1$ in Formula 1 represents that a $k^{th}$ request uses a $(j+1)^{th}$ bandwidth allocation mode, j is greater than or equal to 0 and less than d, and d is a quantity of bandwidth allocation modes that satisfy the $k^{th}$ request; and Formula 2 represents that a sum of bandwidths corresponding to the comprehensive allocation modes is less than or equal to the bandwidth provided by the port, r(k, j) in Formula 2 represents the (j+1)$^{th}$ bandwidth allocation mode of the k$^{th}$ request, and R represents the bandwidth provided by the port. The control device determines the plurality of comprehensive allocation modes for the first service and the second service based on the $i_1{}^{th}$ allocation mode, the $i_2{}^{th}$ allocation mode, and the $i_3{}^{th}$ allocation mode.

$\Sigma_j X(k, j)=0$ in Formula 1 represents that the k$^{th}$ request does not use the (j+1)$^{th}$ bandwidth allocation mode.

In a possible design of the first aspect, that the control device determines a policy violation degree for each of the comprehensive allocation modes based on a bandwidth allocation policy group including a plurality of bandwidth allocation policies, to obtain a plurality of policy violation degrees includes: The control device obtains, based on a first comprehensive allocation mode in the plurality of comprehensive allocation modes, a quantity of violations of each bandwidth allocation policy in the plurality of bandwidth allocation policies. The control device calculates, by using Formula 3 and based on the quantity of violations of the bandwidth allocation policy and a weight value of the bandwidth allocation policy, a policy violation degree corresponding to the first comprehensive allocation mode, where the policy violation degree corresponding to the first comprehensive allocation mode is a sum of products of the quantity of violations of the bandwidth allocation policy and the weight value of the bandwidth allocation policy:

$$\Sigma_x^L (W(x) \times Y(x)) \qquad \text{Formula 3}$$

W(x) in Formula 3 represents a weight value of a bandwidth allocation policy x, Y(x) represents a quantity of violations of the bandwidth allocation policy x, and L represents a quantity of the plurality of bandwidth allocation policies. The control device determines, based on the obtained policy violation degree corresponding to the first comprehensive allocation mode, a policy violation degree corresponding to each of the comprehensive allocation modes for each of the comprehensive allocation modes, to obtain the plurality of policy violation degrees.

A quantity of violations of one bandwidth allocation policy may be calculated based on a comprehensive allocation mode, a first request, a second request, and content of the bandwidth allocation policy.

In a possible design of the first aspect, that the control device determines a preferred comprehensive allocation mode from the plurality of comprehensive allocation modes based on the plurality of policy violation degrees includes: The control device selects a comprehensive allocation mode corresponding to a minimum policy violation degree in the plurality of policy violation degrees as the preferred comprehensive allocation mode.

In a possible design of the first aspect, that the control device determines a preferred comprehensive allocation mode from the plurality of comprehensive allocation modes based on the plurality of policy violation degrees includes: The control device selects, from the plurality of policy violation degrees, a comprehensive allocation mode corresponding to a policy violation degree that is less than or equal to a first threshold as the preferred comprehensive allocation mode.

A value of the policy violation degree corresponding to the comprehensive allocation mode may reflect a conformity degree between the bandwidth allocation mode and a configuration requirement in an implementation process, and the configuration requirement may be reflected by using the plurality of bandwidth allocation policies included in the bandwidth allocation policy group. For example, the comprehensive allocation mode corresponding to the minimum policy violation degree in the plurality of policy violation degrees satisfies the configuration requirement. To further improve the bandwidth usage and reduce the network congestion, it may further be determined whether a quantity of violations of a specific bandwidth allocation policy in parameters required for calculating the minimum policy violation degree is greater than the first threshold. In the parameters required for calculating the minimum policy violation degree, if a quantity of violations of each bandwidth allocation policy is less than or equal to the first threshold, the comprehensive allocation mode is the preferred comprehensive allocation mode. In the parameters required for calculating the minimum policy violation degree, if a quantity of violations of a specific bandwidth allocation policy is greater than the first threshold, a comprehensive allocation mode needs to be re-selected as the preferred comprehensive allocation mode.

In a possible design of the first aspect, that the control device determines a preferred comprehensive allocation mode from the plurality of comprehensive allocation modes based on the plurality of policy violation degrees includes: After determining a bandwidth allocation policy whose quantity of violations is greater than or equal to a second threshold, the control device adjusts weight values of the plurality of bandwidth allocation policies. The control device determines an adjusted policy violation degree for each of the plurality of comprehensive allocation modes based on adjusted weight values of the plurality of bandwidth allocation policies, to obtain a plurality of adjusted policy violation degrees. The control device determines the preferred comprehensive allocation mode from the plurality of comprehensive allocation modes based on the plurality of adjusted policy violation degrees.

The plurality of bandwidth allocation policies include a first bandwidth allocation policy and a second bandwidth allocation policy, and that the control device adjusts weight values of the plurality of bandwidth allocation policies includes: The control device obtains, based on a weight value of the first bandwidth allocation policy and a quantity of violations of the first bandwidth allocation policy, an adjusted weight value of the first bandwidth allocation policy, where the adjusted weight value of the first bandwidth allocation policy is a first weight value, or the adjusted weight value of the first bandwidth allocation policy is a minimum value between a first weight value and a second weight value, the first weight value is a sum of the quantity of violations of the first bandwidth allocation policy and the weight value of the first bandwidth allocation policy, and the second weight value is a preset maximum weight value. The control device obtains an adjusted weight value of the second bandwidth allocation policy based on a weight value of the second bandwidth allocation policy and a quantity of violations of the second bandwidth allocation policy, where the adjusted weight value of the second bandwidth allocation policy is a third weight value, or the adjusted weight value of the second bandwidth allocation policy is a minimum value between a third weight value and the second weight value, and the third weight value is a sum of the quantity of violations of the second bandwidth allocation policy and the weight value of the second bandwidth allocation policy. In the foregoing process of determining the policy violation degree, the control device may obtain the quantity of violations of the first bandwidth allocation policy and the quantity of violations of the second bandwidth allocation policy.

In a possible design of the first aspect, the bandwidth required by the first service and the bandwidth required by the second service each are a bandwidth of a same private line of the port, and that the control device determines, based on a bandwidth provided by a port, the bandwidth required by the first service, and the bandwidth required by the second service, that a bandwidth occupation conflict exists between the first request and the second request includes: The control device determines that the bandwidth of the same private line of the port is less than a sum of the bandwidth required by the first service and the bandwidth required by the second service.

In a possible design of the first aspect, the bandwidth required by the first service and the bandwidth required by the second service are bandwidths of different private lines of the port, and the control device determines, based on a bandwidth provided by a port, the bandwidth required by the first service, and the bandwidth required by the second service, that a bandwidth occupation conflict exists between the first request and the second request includes: The control device determines that an available bandwidth that can be provided by the port is less than a sum of the bandwidth required by the first service and the bandwidth required by the second service.

In a possible design of the first aspect, after the control device determines a preferred comprehensive allocation mode from the plurality of comprehensive allocation modes based on the plurality of policy violation degrees, the method further includes: The control device delivers the preferred comprehensive allocation mode to a forwarding device. The forwarding device is a device in which the port is located.

According to a second aspect, a control device is provided. The control device includes units configured to implement any one of the first aspect or the possible implementations of the first aspect.

According to a third aspect, a computer-readable storage medium is provided. The computer-readable storage medium includes an instruction, and when the instruction is run on a computer, the computer is enabled to perform the method according to any one of the first aspect or the possible designs of the first aspect.

According to a fourth aspect, a computer program product including an instruction is provided. When the computer program product runs on a computer, the computer is enabled to perform the method according to any one of the first aspect or the possible designs of the first aspect.

According to a fifth aspect, a control device is provided. The control device includes a processor, a memory, a bus, and a communications interface, where the memory is configured to store a computer-executable instruction, the processor is connected to the memory by using the bus, and when the control device runs, the processor executes the computer-executable instruction stored in the memory, so that the control device performs the method according to any one of the first aspect or the possible designs of the first aspect.

According to a sixth aspect, a network resource allocation system is provided. The system includes the control device provided in the second aspect or the fifth aspect.

BRIEF DESCRIPTION OF THE DRAWINGS

To describe the technical solutions in the embodiments of this application more clearly, the following briefly describes the accompanying drawings for describing the embodiments.

DETAILED DESCRIPTION OF ILLUSTRATIVE EMBODIMENTS

The following describes the embodiments of the present invention with reference to accompanying drawings.

Embodiments of this application provides a network resource allocation method, including: A control device obtains a first request and a second request, where the first request includes a bandwidth required by a first service, the second request includes a bandwidth required by a second service, and the bandwidth required by the first service and the bandwidth required by the second service are provided by a same port. The control device determines, based on a bandwidth provided by a port, the bandwidth required by the first service, and the bandwidth required by the second service, that a bandwidth occupation conflict exists between the first request and the second request. The control device determines at least one first service allocation mode based on the bandwidth provided by the port and the bandwidth required by the first service. The control device determines at least one second service allocation mode based on the bandwidth provided by the port and the bandwidth required by the second service. The control device determines a plurality of comprehensive allocation modes for the first service and the second service based on the at least one first service allocation mode and the at least one second service allocation mode. The control device determines a policy violation degree for each of the comprehensive allocation modes based on a bandwidth allocation policy group including a plurality of bandwidth allocation policies, to obtain a plurality of policy violation degrees. The control device determines a preferred comprehensive allocation mode from the plurality of comprehensive allocation modes based on the plurality of policy violation degrees.

The first request and the second request each may be an intent request, or may be a request of another type. In the following embodiments of this application, an example in which both the first request and the second request are intent requests is used for description. The first request may further include a type of the first service. The type of the first service is used to identify a type of a bandwidth requested by the first service. The second request may further include a type of the second service. The type of the second service is used to identify a type of a bandwidth requested by the second service. The control device may calculate a quantity of violations of a plurality of bandwidth allocation policies based on the type of the first service and the type of the second service.

Embodiment 1

Figure 1:
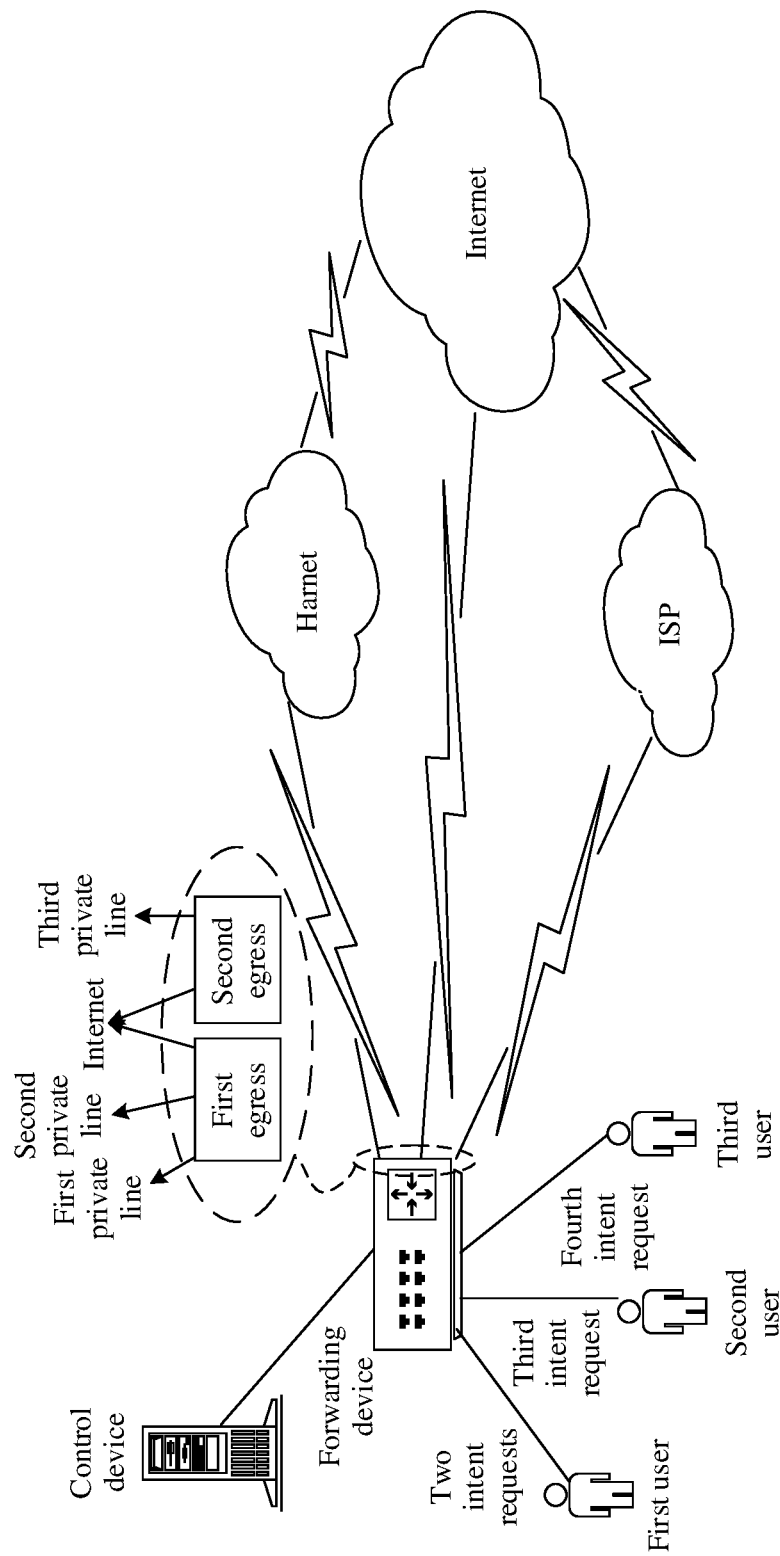
FIG. 1 is a schematic diagram of a network scenario according to Embodiment 1 of this application.

FIG. 1 is a schematic diagram of a network scenario according to Embodiment 1 of this application. In a scenario shown in FIG. 1, a first user sends two intent requests to a forwarding device. The two intent requests include a first intent request and a second intent request. The first intent request includes a type of a first service and a bandwidth required by a first service. The type of the first service is accessing the internet by using a first private line. The bandwidth required by the first service is 5 million bits per second (Mbps). The second intent request includes a type of a second service and a bandwidth required by a second service. The type of the second service is accessing the internet by using the first private line. The bandwidth required by the second service is 8 Mbps. A second user sends a third intent request to a forwarding device. The third intent request includes a type of a third service and a bandwidth required by the third service. The type of the third service is accessing the internet. The bandwidth required by the third service is 5 Mbps. A third user sends a fourth intent request to a forwarding device. The fourth intent request includes a type of a fourth service and a bandwidth required by the fourth service. The type of the fourth service is accessing the internet by using a third private line. The bandwidth required by the fourth service is 6 Mbps. In the scenario shown in FIG. 1, the forwarding device includes a first egress and a second egress. The first egress may access the internet by using the first private line and a second private line. The second egress may access the internet by using the third private line. The first egress and the second egress may further access the internet through a non-private line channel. The private line mentioned in the embodiments of this application may be a link or a tunnel, for example, a link or a tunnel in a local area network. The control device in FIG. 1 can configure and adjust a policy used by the forwarding device. In the scenario shown in FIG. 1, a conflict between a plurality of intent requests refers to a conflict between any two intent requests in the first intent request, the second intent request, the third intent request, and the fourth intent request, or a conflict between more than two intent requests. A Harnet and an ISP in FIG. 1 are network media or network resources that can access the internet.

Figure 2:
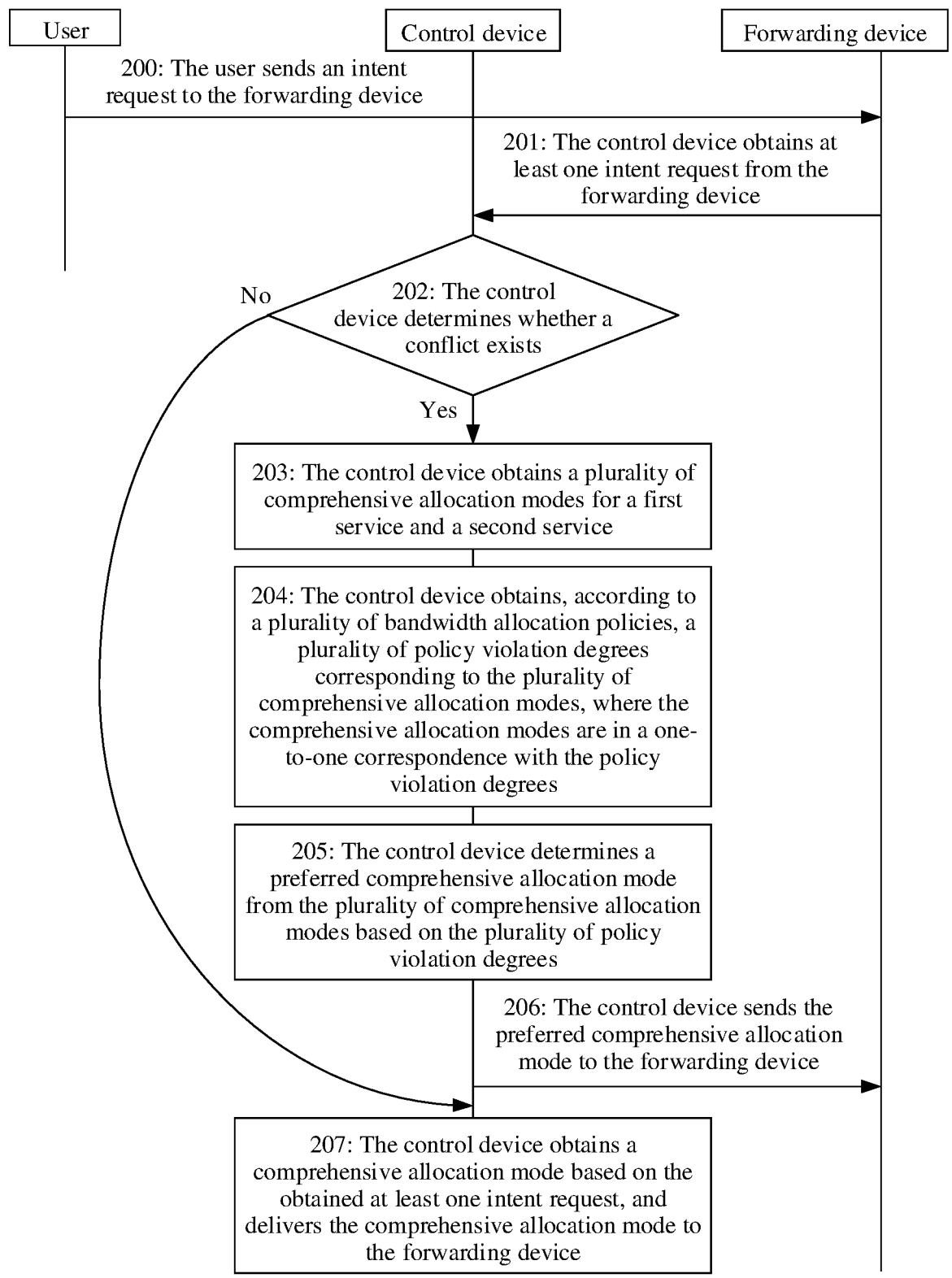
FIG. 2 is a schematic flowchart of a network resource allocation method according to Embodiment 1 of this application.

FIG. 2 is a schematic flowchart of a network resource allocation method according to Embodiment 1 of this application. The method provided in Embodiment 1 is applied to egress traffic control of a local area network such as an enterprise network or a campus network. With reference to the scenarios shown in FIG. 1 and FIG. 2, the following describes the network resource allocation method provided in Embodiment 1 of this application.

200: A user sends an intent request to a forwarding device.

For example, the user sends one or more intent requests to the forwarding device. Any one intent request in the one or more intent requests includes a type of a service and a bandwidth required by the service. The user in Embodiment 1 may be the first user, the second user, or the third user in the scenario shown in FIG. 1. When the user is the first user in the scenario shown in FIG. 1, the intent request is the first intent request or the second intent request in the scenario shown in FIG. 1. When the user is the second user in the scenario shown in FIG. 1, the intent request is the third intent request in the scenario shown in FIG. 1. When the user is the third user in the scenario shown in FIG. 1, the intent request is the fourth intent request in the scenario shown in FIG. 1. For detailed content of the first intent request, the second intent request, the third intent request, and the fourth intent request, refer to detailed descriptions in FIG. 1.

201: A control device obtains at least one intent request from the forwarding device.

For example, the control device reads one or more intent requests from processed intent requests and to-be-processed intent requests in the forwarding device. The one or more intent requests may be all the to-be-processed intent requests, or include at least one to-be-processed intent request. The first intent request, the second intent request, the third intent request, and the fourth intent request include at least one to-be-processed intent request.

202: The control device determines whether a conflict exists, and if the conflict exists, step 203 is performed, or if the conflict does not exist, step 207 is performed.

For example, the control device determines, based on a bandwidth that can be provided by a port of the forwarding device, whether a bandwidth required by the at least one to-be-processed intent request conflicts with a bandwidth required by another intent request. The bandwidth that can be provided by the port of the forwarding device is an available bandwidth that can be provided by an egress port of the forwarding device. The available bandwidth that can be provided by the egress port of the forwarding device may be a bandwidth for accessing a network by using a private line or the internet. The conflict in this embodiment of this application means that the available bandwidth that can be provided by the egress port of the forwarding device cannot satisfy a bandwidth corresponding to a service type in the intent request.

In the scenario shown in FIG. 1, the first intent request may be represented as I1(D1, 5 Mbps). D1 represents the first private line on the first egress in FIG. 1. 5 Mbps represents the bandwidth required by the first service. The first service needs to be completed by using the first private line. The second intent request may be represented as I2(D1, 8 Mbps). 8 Mbps represents the bandwidth required by the second service. The second service needs to be completed by using the first private line. The third intent request may be represented as I3(I, 5 Mbps). I represents the internet in FIG. 1. For example, the first egress or the second egress in FIG. 1 accesses a network by using the internet. 5 Mbps represents the bandwidth required by the third service. The third service needs to be completed by using the internet. The fourth intent request may be represented as I4(D3, 6 Mbps). D3 represents the third private line on the second egress in FIG. 1. 6 Mbps represents the bandwidth required by the fourth service. The fourth service needs to be completed by using the third private line. The control device learns, based on the bandwidth that can be provided on the egress port of the forwarding device, that the D1 private line cannot satisfy requirements of both I1 and I2, and determines that a conflict exists.

203: The control device obtains a plurality of comprehensive allocation modes for the first service and the second service.

For example, any one of the plurality of comprehensive allocation modes for the first service and the second service includes a first bandwidth allocation mode and a second bandwidth allocation mode. The first bandwidth allocation mode is an allocation mode used for the bandwidth required by the first service. The second bandwidth allocation mode is an allocation mode used for the bandwidth required by the second service. That the control device obtains a plurality of comprehensive allocation modes for the first service and the second service includes: The control device determines at least one first service allocation mode based on the bandwidth provided by the port and the bandwidth required by the first service. The control device determines at least one second service allocation mode based on the bandwidth provided by the port and the bandwidth required by the second service. The control device determines a plurality of comprehensive allocation modes for the first service and the second service based on the at least one first service allocation mode and the at least one second service allocation mode.

In the scenario shown in FIG. 1, an available resource on the forwarding device is represented by a vector R: R=($R_{C1}$, $R_{C2}$, $R_{D1}$, $R_{D2}$, $R_{D3}$)=(15, 10, 10, 8, 6). Meanings of elements in the vector R are as follows: $R_{C1}$ represents that private line bandwidth resources that can be occupied at an egress C1 are 15 Mbps. $R_{D1}$ represents that bandwidth resources that can be occupied at D1 are 10 Mbps. $R_{D2}$ represents that bandwidth resources that can be occupied at D2 are 8 Mbps. $R_{C2}$ represents that bandwidth resources that can be occupied at an egress C2 are 10 Mbps. $R_{D3}$ represents that bandwidth resources that can be occupied at D3 are 6 Mbps. An implementation of one intent request is represented as r(k, j). r(k, j) represents a $(j+1)^{th}$ implementation of a $k^{th}$ intent request. r(k, j) may be represented by using a vector. A value of each element in the vector represents usage of the resources in an implementation corresponding to the element. The first intent request is used as an example. I1(D1, 5 Mbps) may be implemented in four manners: (1) I1(D1, 5 Mbps) may be implemented by using the D1 private line of the egress C1, and a bandwidth of 5 Mbps of C1 and a bandwidth of 5 Mbps of D1 are separately occupied, where r(1, 1)=(5, 0, 5, 0, 0). (2) I1(D1, 5 Mbps) may be implemented through internet connection through the egress C1, and a bandwidth of 5 Mbps of C1 needs to be occupied, where r(1, 2)=(5, 0, 0, 0, 0). (3) I1(D1, 5 Mbps) may be implemented through internet connection through the egress C2, and a bandwidth of 5 Mbps of C2 needs to be occupied, where r(1, 3)=(0, 5, 0, 0, 0). (4) If no service is available (the request is rejected), r(1, 0)=(0, 0, 0, 0). The second intent request is used as an example. I2(D1, 8 Mbps) may be implemented in four manners: (1) I2(D1, 8 Mbps) may be implemented by using the D1 private line of the egress C1, and a bandwidth of 8 Mbps of C1 and a bandwidth of 8 Mbps of D1 are separately occupied, where r(2, 1)=(8, 0, 8, 0, 0). (2) I2(D1, 8 Mbps) may be implemented through internet connection through the egress C1, and a bandwidth of 8 Mbps of C1 needs to be occupied, where r(2, 2)=(8, 0, 0, 0, 0). (3) I2(D1, 8 Mbps) may be implemented through internet connection through the egress C2, and a bandwidth of 8 Mbps of C2 needs to be occupied, where r(2, 3)=(0, 8, 0, 0, 0). (4) If no service is available (the request is rejected), r(2, 0)=(0, 0, 0, 0). The third intent request is used as an example. I3(I, 5 Mbps) may be implemented in three manners: (1) I3(I, 5 Mbps) may be implemented by using the internet connection of the egress C1, and a bandwidth of 5 Mbps of C1 needs to be occupied, where r(3, 1)=(5, 0, 0, 0, 0). (2) I3(I, 5 Mbps) may be implemented through internet connection through the egress C2, and a bandwidth of 5 Mbps of C2 needs to be occupied, where r(3, 2)=(0, 5, 0, 0, 0). (3) If no service is available (the request is rejected), r(3, 0)=(0, 0, 0, 0). The fourth intent request is used as an example. I4(D3, 6 Mbps) may be implemented in four manners: (1) I4(D3, 6 Mbps) may be implemented by using the D3 private line of the egress C2, and a bandwidth of 6 Mbps of C2 and a bandwidth of 6 Mbps of D3 are separately occupied, where r(4, 1)=(0, 6, 0, 0, 6). (2) I4(D3, 6 Mbps) may be implemented though internet connection though the egress C1, and a bandwidth of 6 Mbps of C1 needs to be occupied, where r(4, 2)=(6, 0, 0, 0, 0). (3) I4(D3, 6 Mbps) may be implemented though internet connection though the egress C2, and a bandwidth of 6 Mbps of C2 needs to be occupied, where r(4, 3)=(0, 6, 0, 0, 0). (4) If no service is available (the request is rejected), r(4, 0)=(0, 0, 0, 0, 0).

The control device obtains a plurality of comprehensive allocation modes according to Formula 1 and Formula 2. Formula 1 may be expressed as:

$$\Sigma_j X(k,j)=1 \qquad \text{Formula 1}$$

In Formula 1, X(k, j)=1 represents that a $k^{th}$ intent request uses a $(j+1)^{th}$ implementation. X(k, j)=0 represents that the $k^{th}$ request does not use the $(j+1)^{th}$ implementation. A value range of j is determined by a quantity of implementations of the $k^{th}$ intent request. In the scenario shown in FIG. 1, the first intent request, the second intent request, and the fourth intent request each have four implementations. Therefore, for the foregoing three intent requests, a value range of j is from 0 to 3. The third intent request has three implementations. For the third intent request, a value range of j is from 0 to 2.

Formula 2 may be expressed as:

$$\Sigma_{k=1}^{4} X(k,j) r(k,j) \leq R \qquad \text{Formula 2}$$

In Formula 2, X(k, j)r(k, j) represents a bandwidth occupied when a $k^{th}$ intent request uses a $(j+1)^{th}$ implementation. $\Sigma_{k=1}^{4} X(k, j) r(k, j)$ represents a sum of bandwidths occupied by all intent requests (four intent requests in the scenario shown in FIG. 1). Formula 2 represents that a sum of bandwidths occupied by all intent requests (four intent requests in the scenario shown in FIG. 1) is less than or equal to a bandwidth that can be provided by the port of the forwarding device. In Formula 2, when Ab1 in a matrix on the left side of the inequality is less than or equal to Rb1, a value of X(k, j) is an implementation selected by the $k^{th}$ intent request. Ab1 represents an element that is located in row b and column 1 in the matrix and that is calculated based on X(k, j)r(k, j), and b is an integer whose value range is from 1 to 5. Rb1 represents an element that is located in row b and column 1 in the vector R.

The following inequality may be obtained by substituting parameters of the four intent requests in the scenario shown in FIG. 1 into Formula 2:

$$X(1,1)\begin{pmatrix}5\\0\\5\\0\\0\end{pmatrix} + X(1,2)\begin{pmatrix}5\\0\\0\\0\\0\end{pmatrix} + X(1,3)\begin{pmatrix}0\\5\\0\\0\\0\end{pmatrix} + X(2,1)\begin{pmatrix}8\\0\\8\\0\\0\end{pmatrix} +$$

$$X(2,2)\begin{pmatrix}8\\0\\0\\0\\0\end{pmatrix} + X(2,3)\begin{pmatrix}0\\8\\0\\0\\0\end{pmatrix} + X(3,1)\begin{pmatrix}5\\0\\0\\0\\0\end{pmatrix} + X(3,2)\begin{pmatrix}0\\5\\0\\0\\0\end{pmatrix} +$$

$$X(4,1)\begin{pmatrix}0\\6\\0\\0\\6\end{pmatrix} + X(4,2)\begin{pmatrix}6\\0\\0\\0\\0\end{pmatrix} + X(4,3)\begin{pmatrix}0\\6\\0\\0\\0\end{pmatrix} \leq \begin{pmatrix}15\\10\\10\\8\\6\end{pmatrix}$$

A plurality of calculation results may be obtained by solving the foregoing inequality. The plurality of calculation results are the plurality of comprehensive allocation modes. The plurality of comprehensive allocation modes include a first comprehensive allocation mode and a second comprehensive allocation mode. The first comprehensive allocation mode is represented as X(1,3)=1, X(2,1)=1, X(3,2)=1, and X(4,2)=1. A meaning of the first comprehensive allocation mode is as follows: An internet bandwidth of C2 is allocated to the first intent request, and a D1 private line bandwidth of C1 is allocated to the second intent request; and an internet bandwidth of C2 is allocated to the third intent request, and an internet bandwidth of C1 is allocated to the fourth intent request. The second comprehensive allocation mode is represented as: X(1,2)=1, X(2,3)=1, X(3,1)=1, and X(4,0)=1. A meaning of the second comprehensive allocation mode is as follows: An internet bandwidth of C1 is allocated to the first intent request, an internet bandwidth of C2 is allocated to the second intent request, an internet bandwidth of C1 is allocated to the third intent request, and the fourth intent request is rejected.

204: The control device obtains, based on a plurality of bandwidth allocation policies, a plurality of policy violation degrees corresponding to the plurality of comprehensive allocation modes, where the comprehensive allocation modes are in a one-to-one correspondence with the policy violation degrees.

For example, the control device obtains, based on the plurality of bandwidth allocation policies included in a bandwidth allocation policy group, a policy violation degree corresponding to the first comprehensive allocation mode and a policy violation degree corresponding to the second comprehensive allocation mode. The policy violation degree corresponding to the first comprehensive allocation mode is a sum of products of a weight value of each bandwidth allocation policy and a quantity of violations of each bandwidth allocation policy in the first comprehensive allocation mode. The policy violation degree corresponding to the second comprehensive allocation mode is a sum of products of a weight value of each bandwidth allocation policy and a quantity of violations of the bandwidth allocation policies in the second comprehensive allocation mode.

The bandwidth allocation policy group may be represented in a form of a policy table. The policy table is shown in the following Table 1.

TABLE 1

| Number | Weight value | Content of a bandwidth allocation policy |
|---|---|---|
| 1 | 1 | Request Dk and first allocate the Dk |
| 2 | 1 | First allocate a request that requires fewer bandwidths |
| 3 | 1 | Reduce rejection |

The control device calculates, according to Formula 3 to Formula 5, a quantity of violations of each bandwidth allocation policy when the first comprehensive allocation mode is used and a quantity of violations of each bandwidth allocation policy when the second comprehensive allocation mode is used. Formula 3 to Formula 5 may be expressed as:

$$Y(1)=3-\Sigma_{k=1,2,4}X(k,1) \quad \text{Formula 3,}$$

$$Y(3)=\Sigma_k X(k,0) \quad \text{Formula 4, and}$$

$$Y(2)=\Sigma_{k,i}Z(k,i) \quad \text{Formula 5}$$

3 in Formula 3 may be determined based on a quantity of intent requests related to the Dk. For example, if two intent requests in the intent requests are related to the Dk, the constant 3 in Formula 3 may be replaced with a constant 2. Four intent requests in the intent requests are related to the Dk, and the constant 3 in Formula 3 may be replaced with a constant 4. Z(k, i) in Formula 5 needs to satisfy a requirement in Formula 6, and Formula 6 may be expressed as:

$$X(k,0) \leq Z(k,i)+X(i,0)(k,i) \in \{(1,2),(1,4),(3,2),(3,4),(4,2)\} \quad \text{Formula 6}$$

Z(k, i) in Formula 6 is an auxiliary variable, k in Z(k, i) identifies a $k^{th}$ intent request, and may be represented as Ik. i in Z(k, i) identifies an $i^{th}$ intent request, and may be represented as Ii. Ii requires more bandwidth than Ik does. A value of Z(k, i) is 1. It indicates that Ii requiring more bandwidth is satisfied and Ik requiring less bandwidth is not satisfied. A value of Z(k, i) is 0. It indicates that Ik requiring less bandwidth is satisfied and Ii requiring more bandwidth is not satisfied. For example, if I1 is rejected and I2 is satisfied, X(1,0)=1 and X(2,0)=0. According to Formula 6, a value of Z(1,2) is 1. In other words, I2 requiring more bandwidth is satisfied, I1 requiring less bandwidth is rejected, and a bandwidth allocation policy numbered 2 is violated once.

According to the bandwidth allocation policy in Table 1, the first comprehensive allocation mode, and Formula 3, the first intent request, the second intent request, and the fourth intent request are all used to request the private line bandwidth, and only the second intent request is satisfied. A quantity of violations (which may be represented as Y(1)) that the bandwidth allocation policy numbered 1 is violated is 2. According to the bandwidth allocation policy in Table 1, the first comprehensive allocation mode, and Formula 5 and Formula 6, a quantity of violations (which may be represented as Y(2)) of the bandwidth allocation policy numbered 2 is 0. According to the bandwidth allocation policy in Table 1, the first comprehensive allocation mode, and a calculation result of Formula 4, a quantity of violations (which may be represented as Y(3)) of the bandwidth allocation policy numbered 3 is 0.

According to the bandwidth allocation policy in Table 1, the second comprehensive allocation mode, and Formula 3, the first intent request, the second intent request, and the fourth intent request are all used to request the private line bandwidth, and none of the three intent requests is allocated the requested private line bandwidth. A quantity of violations (which may be represented as Y(1)) that the bandwidth allocation policy numbered 1 is violated is 3. According to the bandwidth allocation policy in Table 1, the first comprehensive allocation mode, and Formula 5 and Formula 6, a quantity of violations (which may be represented as Y(2)) of the bandwidth allocation policy numbered 2 is 1. According to the bandwidth allocation policy in Table 1, and a calculation result of Formula 4, a quantity of violations (which may be represented as Y(3)) of the bandwidth allocation policy numbered 3 is 1.

The control device calculates, by using Formula 7 and based on the weight value of each bandwidth allocation policy and the quantity of violations of each bandwidth allocation policy when the first comprehensive allocation mode is used, the policy violation degree corresponding to the first comprehensive allocation mode:

$$\Sigma_x^3 W(x) \times Y(x) \quad \text{Formula 7}$$

x in Formula 7 represents a number of a bandwidth allocation policy. W(x) represents a weight value of a bandwidth allocation policy x. Y(x) represents a quantity of violations of the bandwidth allocation policy x. 3 in Formula 7 represents a quantity of bandwidth allocation policies. In other words, the value may be set according to the quantity of bandwidth allocation policies. For the first comprehensive allocation mode, Y(1)=2, Y(2)=Y(3)=0, and the weight value of each bandwidth allocation policy is 1. Therefore, the policy violation degree that is corresponding to the first comprehensive allocation mode and that is calculated by the control device according to Formula 7 is 2.

The control device calculates, by using Formula 7 and based on the weight value of each bandwidth allocation policy and the quantity of violations of each bandwidth allocation policy when the second comprehensive allocation mode is used, the policy violation degree corresponding to the second comprehensive allocation mode. For the second comprehensive allocation mode, $Y(1)=3$, $Y(2)=Y(3)=1$, and the weight value of each bandwidth allocation policy is 1. Therefore, the policy violation degree that is corresponding to the second comprehensive allocation mode and that is calculated by the control device is 5.

205: The control device determines a preferred comprehensive allocation mode from the plurality of comprehensive allocation modes based on the plurality of policy violation degrees.

For example, the control device may determine, as the preferred comprehensive allocation mode, a comprehensive allocation mode corresponding to a minimum value in the plurality of policy violation degrees. Alternatively, the control device selects, from the plurality of policy violation degrees, a comprehensive allocation mode corresponding to a policy violation degree that is less than or equal to a first threshold as the preferred comprehensive allocation mode.

In the scenario shown in FIG. 1, the control device determines the first comprehensive allocation mode as the preferred comprehensive allocation mode based on the calculation result in 204 and a selection basis with a minimum policy violation degree. Alternatively, when the first threshold is set to 3, the control device determines the first comprehensive allocation mode as the preferred integrated allocation mode based on the calculation result in 204 and the first threshold.

206: The control device sends the preferred comprehensive allocation mode to the forwarding device.

For example, the control device sends the preferred comprehensive allocation mode to an intent request translator on the forwarding device, and the intent request translator may convert the received preferred comprehensive allocation mode into a bandwidth configuration rule on the egress port of the forwarding device. A method used by the intent request translator to convert a data solving model into a matching rule may be a common method used by the intent request translator. Details are not described herein again.

207: The control device obtains a comprehensive allocation mode based on the obtained at least one intent request, and delivers the comprehensive allocation mode to the forwarding device.

For example, if the control device determines that no conflict exists, the operation in 207 is performed, and the control device may obtain the comprehensive allocation mode based on the obtained at least one intent request. In the scenario shown in FIG. 1, the first intent request is represented as I1(D1, 5 Mbps), the second intent request is represented as I2(D1, 8 Mbps), the third intent request is represented as I3(I, 5 Mbps), and the fourth intent request is represented as I4(D3, 6 Mbps). In a case in which no conflict exists, the control device combines the foregoing four intent requests into the comprehensive allocation mode, and delivers the comprehensive allocation mode to the corresponding forwarding device.

To make the comprehensive allocation mode more compliant with content of the bandwidth allocation policy, after determining the first comprehensive allocation mode in 205, the control device may further perform 208 and 209 in the following.

208: The control device determines whether there is a bandwidth allocation policy in which a quantity of violations is greater than or equal to a second threshold, and if existent, step 209 is performed, or if not existent, step 206 is performed.

For example, when the second threshold is 2, the first control device determines, based on the quantity of violations of each bandwidth allocation policy when the first comprehensive allocation mode is used and that is obtained in 204, that the quantity of violations of the bandwidth allocation policy numbered 1 is equal to the second threshold, and the control device performs 209.

209: The control device adjusts weight values of a plurality of bandwidth allocation policies based on the plurality of violations of each bandwidth allocation policy calculated in 204.

For example, the control device may adjust the weight value of the bandwidth allocation policy in Table 1 according to $Y(1)=2$ and $Y(2)=Y(3)=0$ that are calculated in 204. A method for adjusting the weight values of the plurality of bandwidth allocation policies by the control device includes the following several manners: In a first manner, the control device uses a sum of a weight value of an $n^{th}$ bandwidth allocation policy and a quantity of violations of the $n^{th}$ bandwidth allocation policy as an adjusted weight value of the $n^{th}$ bandwidth allocation policy. In a second manner, the control device uses a minimum value between a first weight value of an $n^{th}$ bandwidth allocation policy and a second weight value of the $n^{th}$ bandwidth allocation policy as an adjusted weight value of the $n^{th}$ bandwidth allocation policy. The first weight value of the $n^{th}$ bandwidth allocation policy is a sum of the weight value of the $n^{th}$ bandwidth allocation policy and a quantity of violations of the $n^{th}$ bandwidth allocation policy. The second weight value of the $n^{th}$ bandwidth allocation policy is a maximum weight value of all policies. In a third manner, after a quantity of violations of an $n^{th}$ bandwidth allocation policy is greater than 3, the control device sets an adjusted weight value of the $n^{th}$ bandwidth allocation policy to a maximum weight value. In a fourth manner, in a case in which weight values of all bandwidth allocation policies are the same, the control device obtains an adjusted weight value after subtracting m from the weight values of all the bandwidth allocation policies. m is greater than or equal to 1 and less than a weight value before adjustment. The $n^{th}$ bandwidth allocation policy is any one of the plurality of bandwidth allocation policies.

In the scenario shown in FIG. 1, the control device may use the foregoing first manner to adjust the weight values of the bandwidth allocation policies included in Table 1, to obtain Table 2. The control device calculates $Y(1)=2$, $Y(2)=Y(3)=0$ in 204. The control device obtains adjusted weight values of the plurality of bandwidth allocation policies based on a value of $Y(x)$ and the weight values of the bandwidth allocation policies included in Table 1. The adjusted weight values of the plurality of bandwidth allocation policies may be represented by using Table 2.

TABLE 2

| Number | Weight value | Content of a bandwidth allocation policy |
|---|---|---|
| 1 | 3 | Request Dk and first allocate the Dk |
| 2 | 1 | First allocate a request that requires fewer bandwidths |
| 3 | 1 | Reduce rejection |

The control device may select one comprehensive allocation mode according to the method of 203 to 205 and based on the adjusted weight values of the plurality of bandwidth allocation policies in Table 2, and the comprehensive allocation mode can satisfy requirements of Formula 1 to Formula 7, and can also satisfy a requirement that a quantity of violations of any bandwidth allocation policy is less than the second threshold. For example, when the control device calculates, according to the method of 203 to 205, a comprehensive allocation mode that satisfies Formula 2, a weight of the bandwidth allocation policy numbered 1 is 3. In addition, when the comprehensive allocation mode that satisfies Formula 2 is calculated, a comprehensive allocation mode with a minimum quantity of violations of the bandwidth allocation policy numbered 1 needs to be selected, to satisfy the requirement of Formula 7. When $X(1,1)=1$, $X(2,0)=1$, $X(3,2)=1$, and $X(4,1)=1$, a calculation result of Formula 7 is a minimum value while the following inequality can be satisfied.

$$X(1,1)\begin{pmatrix}5\\0\\5\\0\\0\end{pmatrix} + X(1,2)\begin{pmatrix}5\\0\\0\\0\\0\end{pmatrix} + X(1,3)\begin{pmatrix}0\\5\\0\\0\\0\end{pmatrix} + X(2,1)\begin{pmatrix}8\\0\\8\\0\\0\end{pmatrix} +$$

$$X(2,2)\begin{pmatrix}8\\0\\0\\0\\0\end{pmatrix} + X(2,3)\begin{pmatrix}0\\8\\0\\0\\0\end{pmatrix} + X(3,1)\begin{pmatrix}5\\0\\0\\0\\0\end{pmatrix} + X(3,2)\begin{pmatrix}0\\0\\5\\0\\0\end{pmatrix} +$$

$$X(4,1)\begin{pmatrix}0\\6\\0\\0\\6\end{pmatrix} + X(4,2)\begin{pmatrix}6\\0\\0\\0\\0\end{pmatrix} + X(4,3)\begin{pmatrix}0\\6\\0\\0\\0\end{pmatrix} \leq \begin{pmatrix}15\\10\\10\\8\\6\end{pmatrix}$$

According to $X(1,1)=1$, $X(2,0)=1$, $X(3,2)=1$, and $X(4,1)=1$ that are obtained by solving the foregoing inequality, $Y(1)=1$, $Y(2)=0$, and $Y(3)=1$ may be calculated. If any value of $Y(x)$ is less than the second threshold, the control device uses a combination of $X(1,1)=1$, $X(2,0)=1$, $X(3,2)=1$, and $X(4,1)=1$ as the preferred comprehensive allocation mode, and then 206 is performed.

Optionally, between 208 and 209, the method provided in this embodiment of this application may further include: The control device determines whether the quantity of adjustment times for the bandwidth allocation policy group is greater than a third threshold. If the quantity of adjustment times for the bandwidth allocation policy group is less than or equal to the third threshold, 208 is performed; or if the quantity of adjustment times for the bandwidth allocation policy group is greater than the third threshold, an error is reported or is output to a network management system to prompt that the requirement cannot be satisfied. The third threshold may be an integer greater than or equal to 1. For example, a value of the third threshold may be 1. The control device may determine whether a quantity of adjustment times for the bandwidth allocation policy group in an adjustment period is greater than the third threshold. After determining to perform 209, the control device may increase the quantity of adjustment times for the bandwidth allocation policy group in the adjustment period by L, where L is an integer greater than or equal to 1, to subsequently determine, by using an updated quantity of adjustment times, whether 209 needs to be performed.

In the method provided in this embodiment of this application, the control device may consider the quantity of violations of the plurality of bandwidth allocation policies included in the bandwidth allocation policy group when selecting the preferred comprehensive allocation mode, so that the determined preferred comprehensive allocation mode can more properly satisfy the plurality of bandwidth allocation policies. This improves the bandwidth usage and reduces the network congestion.

Embodiment 2

Figure 3:
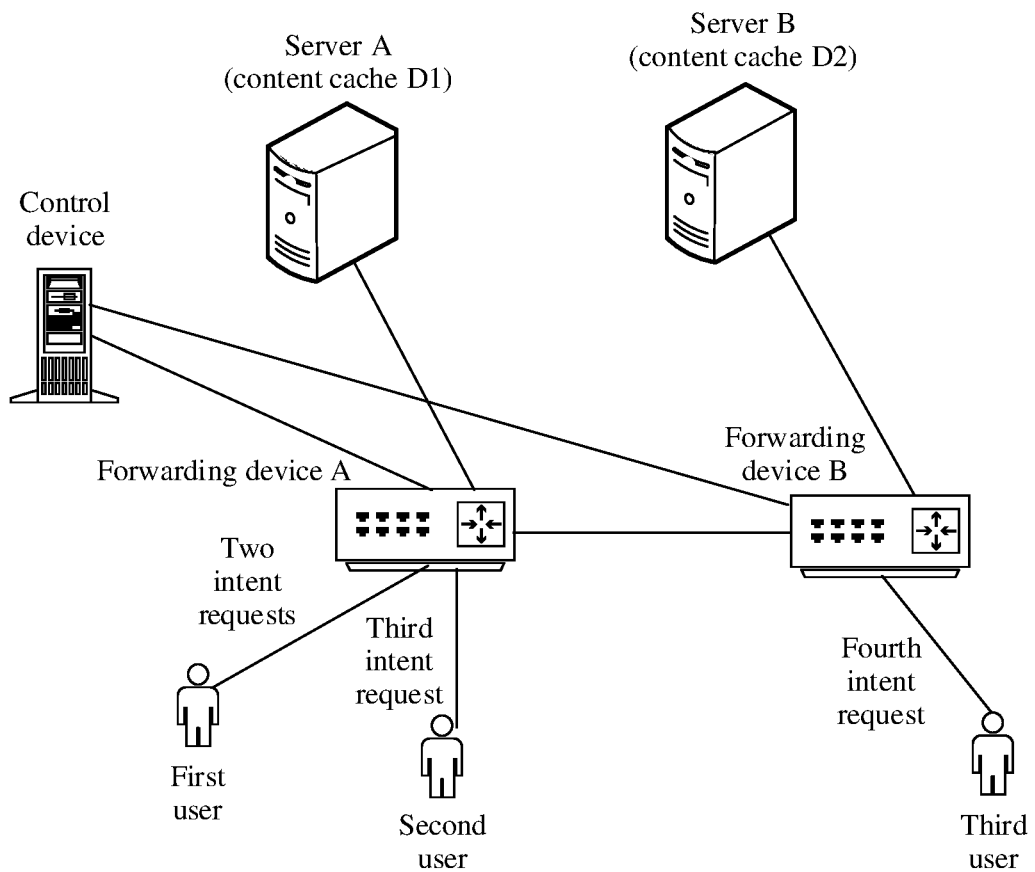
FIG. 3 is a schematic diagram of a network scenario according to Embodiment 2 of this application.

FIG. 3 is a schematic diagram of a network scenario according to Embodiment 2 of this application. In a scenario shown in FIG. 3, a first user sends two intent requests to a forwarding device. The two intent requests include a first intent request and a second intent request. The first intent request includes a type of a first service and storage space required by the first service. The type of the first service is occupying content cache space identified by D1. The storage space required by the first service is 5 megabytes (MB). The second intent request includes a type of a second service and storage space required by the second service. The type of the second service is occupying content cache space identified by D1. The storage space required by the second service is 8 MB. A second user sends a third intent request to a forwarding device. The third intent request includes a type of a third service and storage space required by the third service. The type of the third service is occupying content cache space identified by D1 or D2. The storage space required by the third service is 5 MB. A third user sends a fourth intent request to a forwarding device. The fourth intent request includes a type of a fourth service and storage space required by the fourth service. The type of the fourth service is occupying content cache space identified by D2. The storage space required by the fourth service is 6 MB. In the scenario shown in FIG. 3, the foregoing four intent requests may request, by using adjacent forwarding devices of the four intent requests, a server A and a server B to use the cache space. In the scenario shown in FIG. 3, a conflict between a plurality of intent requests refers to a conflict between any two intent requests in the first intent request, the second intent request, the third intent request, and the fourth intent request, or a conflict between more than two intent requests in a process of occupying the cache space. In FIG. 3, the content cache space identified by D1 is 10 MB, and the content cache space identified by D2 is 5 MB. The content cache space that can be provided by the server A and the server B may be represented by a vector R, which is specifically $R=(RD1, RD2)=(10, 5)$. Elements in the vector R are described as follows: RD1 represents that the cache space identified by D1 is 10 MB. RD2 represents that the cache space identified by D2 is 5 MB.

For example, an implementation of one intent request is represented as $r(k, j)$. $r(k, j)$ represents a $(j+1)^{th}$ implementation of a $k^{th}$ intent request. r(k, j) may be represented by using a vector. A value of each element in the vector represents usage of the resources in an implementation corresponding to the element. The first intent request is used as an example. I1(D1, 5 MB) may be implemented in four manners: (1) If the I1(D1, 5 MB) is cached in D1, r(1,1)=(5, 0). (2) If the I1(D1, 5 MB) is cached in D2, r(1, 2)=(0, 5). (3) If the I1(D1, 5 MB) cannot be cached (the request is rejected), r(1, 0)=(0, 0). The second intent request is used as an example. I2(D1, 8 MB) may be implemented in four manners: (1) If the I2(D1, 8 MB) is cached in D1, r(2, 1)=(8, 0). (2) If the I2(D1, 8 MB) is cached in D2, r(2, 2)=(0, 8). (3) If the I2(D1, 8 MB) cannot be cached (the request is rejected), r(2, 0)=(0, 0). The third intent request is used as an example. I3(D1/D2, 5 MB) may be implemented in three manners: (1) If the I3(D1/D2, 5 MB) is cached in D1, r(3, 1)=(5, 0). (2) If the I3(D1/D2, 5 MB) is cached in D2, r(3, 2)=(0, 5). (3) If the I3(D1/D2, 5 MB) cannot be cached (the request is rejected), r(3, 0)=(0, 0). The fourth intent request is used as an example. I4(D2, 6 MB) may be implemented in four manners: (1) If the I4(D2, 6 MB) is cached in D2, r(4,1)=(0, 6). (2) If the I4(D2, 6 MB) is cached in D1, r(4, 2)=(6, 0). (3) If the I4(D2, 6 MB) cannot be cached (the request is rejected), r(4, 0)=(0, 0).

The control device may obtain the first comprehensive allocation mode and the second comprehensive allocation mode by using Formula 1 and Formula 2 in Embodiment 1. The first comprehensive allocation mode may include: X(1, 0)=1, X(2,1)=1, X(3,2)=1, and X(4,0)=1. The second comprehensive allocation mode may include: X(1,2)=1, X(2,0)=1, X(3,0)=1, and X(4,1)=1. The control device may obtain a quantity of violations of each policy according to a policy table shown in Table 3.

TABLE 3

| Number | Weight value | Content of a policy |
|---|---|---|
| 1 | 1 | Select close cache space |
| 2 | 3 | Reduce rejection |

The control device may learn, based on the first comprehensive allocation mode, that the first intent request and the fourth intent request are rejected, and Y(2)=2 is calculated. The content cache space identified by D1 is allocated to the second intent request, and a policy numbered 1 is satisfied. If the content cache space identified by D2 is allocated to the third intent request, and the policy numbered 1 is not satisfied, Y(1)=1. Correspondingly, the control device may calculate, based on the weight values of the policies in Table 3, that the policy violation degree corresponding to the first comprehensive allocation mode is 7.

The control device may learn, based on the second comprehensive allocation mode, that the second intent request and the third intent request are rejected, and Y(2)=2 is calculated. The content cache space identified by D2 is allocated to the first intent request, and the content cache space identified by D1 is allocated to the fourth intent request, where Y(1)=2. Correspondingly, the control device may calculate, based on the weight values of the policies in Table 3, that the policy violation degree corresponding to the second comprehensive allocation mode is 8.

The control device may select the second comprehensive allocation mode as the preferred comprehensive allocation mode by using the method in Embodiment 1, and deliver the preferred comprehensive allocation mode to the corresponding forwarding device, so that the forwarding device can send the intent request of the user to the corresponding server.

Optionally, the control device may determine, by using the method of 208 and 209 in Embodiment 1, whether the second comprehensive allocation mode satisfies a requirement of the policy in Table 3, and whether a weight of the policy in Table 3 needs to be further adjusted. Details are not described herein again.

Figure 4:
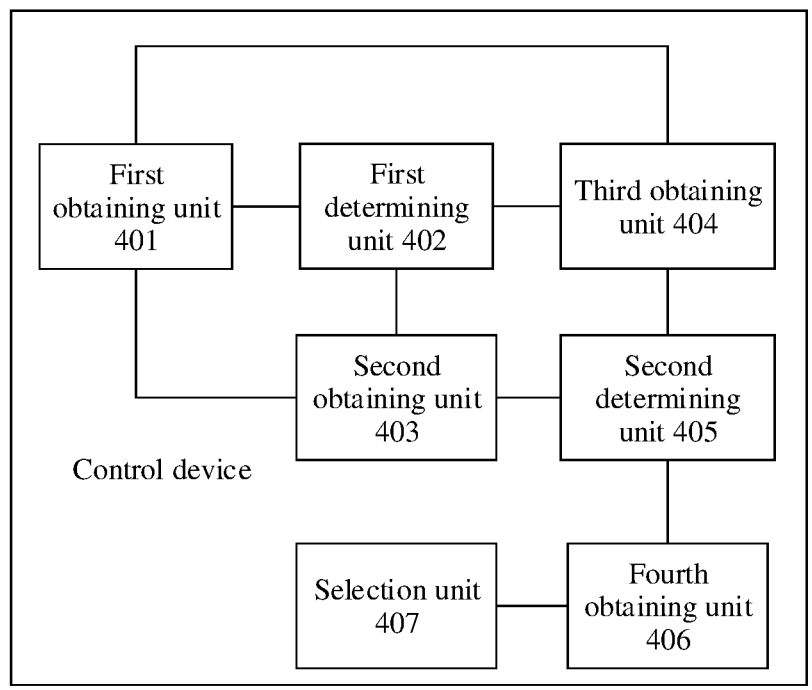
FIG. 4 is a schematic structural diagram of a control device according to an embodiment of this application.

FIG. 4 is a schematic structural diagram of a control device according to an embodiment of this application. The control device in this embodiment may be the control device in Embodiment 1 or Embodiment 2. The following describes, with reference to FIG. 4, the control device provided in this embodiment of this application.

An embodiment of this application provides a control device. The control device includes: a first obtaining unit 401, a first determining unit 402, a second obtaining unit 403, a third obtaining unit 404, a second determining unit 405, a fourth obtaining unit 406, and a selection unit 407.

The first obtaining unit 401 is configured to obtain a first request and a second request, where the first request includes a bandwidth required by a first service, the second request includes a bandwidth required by a second service, and the bandwidth required by the first service and the bandwidth required by the second service are provided by a same port. The first determining unit 402 is configured to determine, based on a bandwidth provided by a port, the bandwidth required by the first service, and the bandwidth required by the second service, that a bandwidth occupation conflict exists between the first request and the second request. The second obtaining unit 403 is configured to determine at least one first service allocation mode based on the bandwidth provided by the port and the bandwidth required by the first service. The third obtaining unit 404 is configured to determine at least one second service allocation mode based on the bandwidth provided by the port and the bandwidth required by the second service. The second determining unit 405 is configured to determine a plurality of comprehensive allocation modes for the first service and the second service based on the at least one first service allocation mode and the at least one second service allocation mode. The fourth obtaining unit 406 is configured to determine a policy violation degree for each of the comprehensive allocation modes based on a bandwidth allocation policy group including a plurality of bandwidth allocation policies, to obtain a plurality of policy violation degrees. The selection unit 407 is configured to determine a preferred comprehensive allocation mode from the plurality of comprehensive allocation modes based on the plurality of policy violation degrees.

For example, the second determining unit 405 is specifically configured to: select, from the at least one first service allocation mode and the at least one second service allocation mode, an $i_1^{th}$ allocation mode, an $i_2^{th}$ allocation mode, and an $i_3^{th}$ allocation mode that satisfy Formula 1 and Formula 2, where the $i_1^{th}$ allocation mode, the $i_2^{th}$ allocation mode, and the $i_3^{th}$ allocation mode at least include one first service allocation mode and one second service allocation mode:

$$\Sigma_j X(k,j)=1 \quad \text{Formula 1, and}$$

$$\Sigma_1 X(k,j)r(k,j) \le R \quad \text{Formula 2}$$

$\Sigma_j X(k, j)=1$ in Formula 1 represents that a $k^{th}$ request uses a $(j+1)^{th}$ bandwidth allocation mode, j is greater than or equal to 0 and less than d, and d is a quantity of bandwidth allocation modes that satisfy the $k^{th}$ request; and Formula 2 represents that a sum of bandwidths corresponding to the comprehensive allocation modes is less than or equal to the bandwidth provided by the port, r(k, j) in Formula 2 represents the $(j+1)^{th}$ bandwidth allocation mode of the $k^{th}$ request, and R represents the bandwidth provided by the port; and determine the plurality of comprehensive allocation modes for the first service and the second service based on the $i_1^{th}$ allocation mode, the $i_2^{th}$ allocation mode, and the $i_3^{th}$ allocation mode.

For example, the fourth obtaining unit 406 is specifically configured to: obtain, based on a first comprehensive allocation mode in the plurality of comprehensive allocation modes, a quantity of violations of each bandwidth allocation policy in the plurality of bandwidth allocation policies; calculate, by using Formula 3 and based on the quantity of violations of the bandwidth allocation policy and a weight value of the bandwidth allocation policy, a policy violation degree corresponding to the first comprehensive allocation mode, where the policy violation degree corresponding to the first comprehensive allocation mode is a sum of products of the quantity of violations of the bandwidth allocation policy and the weight value of the bandwidth allocation policy:

$$\Sigma_x^L(W(x) \times Y(x)) \quad \text{Formula 3}$$

W(x) in Formula 3 represents a weight value of a bandwidth allocation policy x, Y(x) represents a quantity of violations of the bandwidth allocation policy x, and L represents a quantity of the plurality of bandwidth allocation policies; and determine, based on the obtained policy violation degree corresponding to the first comprehensive allocation mode, a policy violation degree corresponding to each of the comprehensive allocation modes for each of the comprehensive allocation modes, to obtain the plurality of policy violation degrees.

In an implementation, the selection unit 407 is specifically configured to: select, from the plurality of policy violation degrees, a comprehensive allocation mode corresponding to a policy violation degree that is less than or equal to a first threshold as the preferred comprehensive allocation mode; or select a comprehensive allocation mode corresponding to a smallest policy violation degree in the plurality of policy violation degrees as the preferred comprehensive allocation mode.

In another implementation, the selection unit 407 is specifically configured to: after determining a bandwidth allocation policy whose quantity of violations is greater than or equal to a second threshold, adjust weight values of the plurality of bandwidth allocation policies; determine an adjusted policy violation degree for each of the plurality of comprehensive allocation modes based on adjusted weight values of the plurality of bandwidth allocation policies, to obtain a plurality of adjusted policy violation degrees; and determine the preferred comprehensive allocation mode from the plurality of comprehensive allocation modes based on the plurality of adjusted policy violation degrees.

For example, the bandwidth required by the first service and the bandwidth required by the second service each are a bandwidth of a same private line of the port, and the first determining unit 401 is specifically configured to determine that the bandwidth occupation conflict exists between the first request and the second request when the bandwidth of the same private line of the port is less than a sum of the bandwidth required by the first service and the bandwidth required by the second service. Alternatively, the bandwidth required by the first service and the bandwidth required by the second service are bandwidths of different private lines of the port, and the first determining unit 401 is specifically configured to determine that the bandwidth occupation conflict exists between the first request and the second request when the bandwidth of the same private line of the port is less than a sum of the bandwidth required by the first service and the bandwidth required by the second service.

Optionally, the control device further includes a sending unit. The sending unit is configured to send the preferred comprehensive allocation mode to a corresponding forwarding device. For a specific function of the foregoing unit, refer to an action performed by the control device in Embodiment 1 or Embodiment 2. Details are not described herein again.

Figure 5:
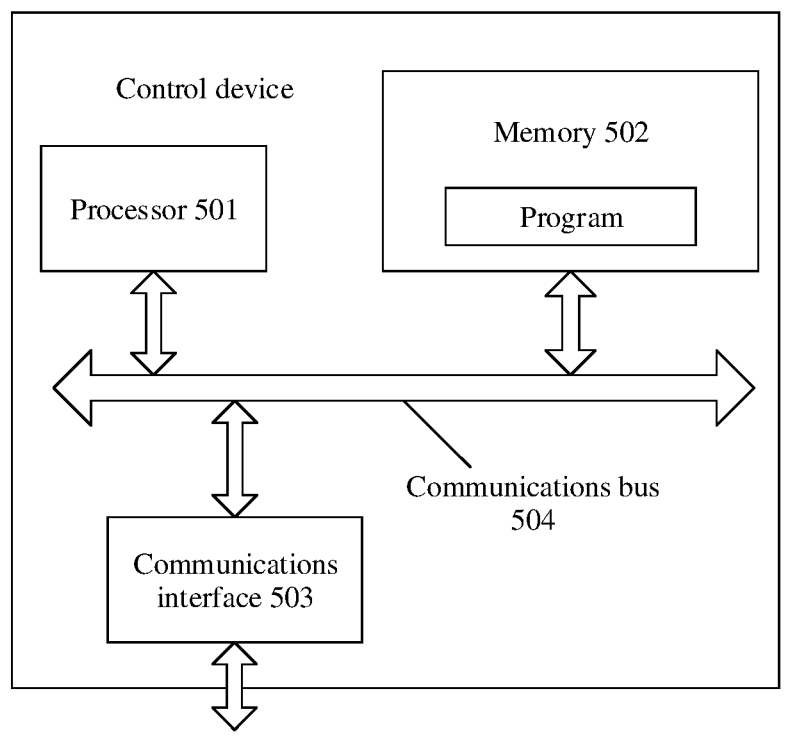
FIG. 5 is a schematic structural diagram of a control device according to an embodiment of this application.

FIG. 5 is a schematic structural diagram of a control device according to an embodiment of this application. The control apparatus provided in this embodiment of this application may be the control device in the embodiment corresponding to FIG. 4, and may perform the method performed by the control device in Embodiment 1 or Embodiment 2. In this embodiment of this application, a structure of the control device is described from a perspective of hardware implementation. The control device in this embodiment includes a processor 501, a memory 502, and a communications interface 503. The processor 501, the memory 502, and the communications interface 503 are connected by using a communications bus 504. The memory 502 is configured to store a program. The processor 501 performs, according to an executable instruction included in the program read from the memory 502, method steps performed by the control device in Embodiment 1 or Embodiment 2. The processor 501 may receive and send a message or a packet by using the communications interface 503. For details, refer to the corresponding content in Embodiment 1 or in Embodiment 2.

The control device provided in the embodiments of this application can adjust and update a weight value of a policy in a policy table. In a possible implementation, a policy management unit disposed outside the control device may deliver the policy table to the control device, update the weight value of the policy in the policy table based on a quantity of violations of each policy obtained by the control device, and send an updated policy table to the control device. The policy management unit disposed outside the control device may communicate with the control device by using the network configuration protocol (Network Configuration Protocol, NETCONF).

A scenario in Embodiment 1 is used as an example. In a process in which the policy management unit delivers the policy table to the control device, a message format used by the policy management unit may be expressed as:

Notification request-message-id = 201> //Notification message, and an identifier of the message is 201
  <event>
    <policy_table operation = "REPORT"> //An object name is a policy table, and an action type is report (REPORT)
      <policies>
        <policy_id>1</policy_id>
        <weight>1</weight>
        <policy_body>Request Dk and first allocate the Dk<policy_body>
        <policy_id>2</policy_id>
        <weight>1</weight>
        <policy_body>First allocate a request that requires fewer bandwidths<policy_body>

```
        <policy__id>3</policy__id>
        <weight>1</weight>
        <policy__body>Reduce rejection<policy__body>
    </policies>
  </event>
</Notification>
```

In the scenario of Embodiment 1, the quantity of violations of each policy sent by the control device to the policy management unit may be expressed in the following message format:

```
<RPC message-id = 101> //RPC request message, and an identifier
of the message is 101
    <edit-config>
      <policy-table> //An object name is a policy table
      <policy-table-entry operation = "update">
          <name>policy-execution-result</name> //Policy execution
          result
            <policy__id>1</policy__id> //Policy 1
            <rejection__num>2</rejection__num> //A quantity of
            violations is 2
          </policy-table-entry>
        </policy-table >
    </edit-config>
      </RPC>
```

In the scenario of Embodiment 1, for an action of delivering the updated policy table by the policy management unit, in this embodiment of this application, to save network resources, an incremental update manner is used. The policy management unit sends, to the control device, an entry whose weight value needs to be modified. An example in which a weight of the policy 1 is modified is used, and a format of a message delivered by the policy management unit is expressed as follows:

```
      <rpc-reply message-id = "101" xmlns =
    "urn:ietf:params:xml:ns:netconf:base:1.0">
        <updated__policy>
          <policy>
            <policy__id>1</policy__id> //Policy 1
            <weight>3</weight> //A weight value is 3
          </policy>
        </updated__policy>
      </rpc-reply>
```

A scenario in Embodiment 2 is used as an example. In a process in which the policy management unit delivers the policy table to the control device, a message format used by the policy management unit may be expressed as:

```
Notification request-message-id = 201> //Notification message, and an
identifier of the message is 201
    <event>
      <policy__table operation = "REPORT"> //An object name is a
policy table, and an action type is report (REPORT)
        <policies>
          <policy__id>1</policy__id>
          <weight>1</weight>
          <policy__body>Select close cache space<policy__body>
          <policy__id>2</policy__id>
          <weight>3</weight>
          <policy__body>Reduce rejection<policy__body>
        </policies>
      </event>
</Notification>
```

In the scenario of Embodiment 2, the quantity of violations of each policy sent by the control device to the policy management unit may be expressed in the following message format:

```
<RPC message-id = 101> //RPC request message, and an identifier
of the message is 101
    <edit-config>
      <policy-table> //An object name is a policy table
        <policy-table-entry operation = "update">
          <name>policy-execution-result</name> //Policy
          execution result
            <policy__id>1</policy__id> //Policy 1
  <rejection__num>2</rejection__num> //A quantity of violations is 2
</policy-table-entry>
        </policy-table>
    </edit-config>
      </RPC>
```

In the scenario of Embodiment 2, for an action of delivering the updated policy table by the policy management unit, in this embodiment of this application, to save network resources, an incremental update manner is used. The policy management unit sends, to the control device, an entry whose weight value needs to be modified. An example in which a weight of the policy 1 is modified is used, and a format of a message delivered by the policy management unit is expressed as follows:

```
      <rpc-reply message-id = "101" xmlns =
    "urn:ietf:params:xml:ns:netconf:base:1.0">
        <updated__policy>
          <policy>
            <policy__id>1</policy__id> //Policy 1
            <weight>3</weight> //A weight value is 3
          </policy>
        </updated__policy>
      </rpc-reply>
```

The general-purpose processor mentioned in the embodiments of this application may be a microprocessor, or the processor may be any conventional processor. The steps of the methods disclosed with reference to the embodiments of the present invention may be directly performed by using a combination of hardware in the processor and a software module. When it is implemented by using software, code that implements the foregoing functions may be stored in a computer-readable medium. The computer-readable medium includes a computer storage medium. The storage medium may be any available medium accessible to a computer. The following is used as an example but is not limited: The computer-readable medium may be a random access memory (RAM), a read-only memory (ROM), an electrically erasable programmable read-only memory (EEPROM), a compact disc read-only memory (CD-ROM) or other optical disk storage, a disk storage medium or other disk storage, or any other medium that can be used to carry or store expected program code in a command or data structure form and can be accessed by a computer. The computer-readable medium may be a compact disc (CD), a laser disc, a digital video disc (DVD), a floppy disk, or a Blu-ray disc.

The embodiments in this specification are all described in a progressive manner, for same or similar parts in the embodiments, refer to these embodiments, and each embodiment focuses on a difference from other embodiments. Especially, a system embodiment is basically similar to a method embodiment, and therefore is described briefly. For related parts, refer to partial descriptions in the method embodiment.

What is claimed is:

1. A method, comprising:
obtaining, by a control device, a first request and a second request, wherein the first request comprises a bandwidth required by a first service, the second request comprises a bandwidth required by a second service, and the bandwidth required by the first service and the bandwidth required by the second service are to be provided by a same port;
determining, by the control device based on a bandwidth currently provided by a first port, the bandwidth required by the first service, and the bandwidth required by the second service, that a bandwidth occupation conflict exists between the first request and the second request;
determining, by the control device, at least one first service allocation mode based on the bandwidth currently provided by the first port and the bandwidth required by the first service;
determining, by the control device, at least one second service allocation mode based on the bandwidth currently provided by the first port and the bandwidth required by the second service;
determining, by the control device, a plurality of comprehensive allocation modes for the first service and the second service based on the at least one first service allocation mode and the at least one second service allocation mode;
determining, by the control device, a policy violation degree for each comprehensive allocation mode of the plurality of comprehensive allocation modes based on a bandwidth allocation policy group comprising a plurality of bandwidth allocation policies, to obtain a plurality of policy violation degrees;
determining, by the control device, a selected comprehensive allocation mode from the plurality of comprehensive allocation modes based on the plurality of policy violation degrees; and
configuring or adjusting, by the control device, a policy used by a forwarding device based on the selected comprehensive allocation mode.

2. The method according to claim 1, wherein determining, by the control device, the plurality of comprehensive allocation modes for the first service and the second service based on the at least one first service allocation mode and the at least one second service allocation mode comprises:
selecting, by the control device from the at least one first service allocation mode and the at least one second service allocation mode, $i_1^{th}$ allocation mode, an $i_2^{th}$ allocation mode, and an $i_3^{th}$ allocation mode that satisfy a Formula 1 and a Formula 2, wherein the $i_1^{th}$ allocation mode, the $i_2^{th}$ allocation mode, and the $i_3^{th}$ allocation mode comprise at least a first service allocation mode of the at least one first service allocation mode and a second service allocation mode of the at least one second service allocation mode; and
determining, by the control device, the plurality of comprehensive allocation modes for the first service and the second service based on the $i_1^{th}$ allocation mode, the $i_2^{th}$ allocation mode, and the $i_3^{th}$ allocation mode; and wherein Formula 1 and Formula 2 are as follows:

$$\Sigma_j X(k,j)=1 \quad \text{Formula 1, and}$$

$$\Sigma_{k=1}^{2} X(k,j) r(k,j) \leq R \quad \text{Formula 2}$$

wherein $\Sigma_j X(k, j)=1$ in represents that a $k^{th}$ request uses a $(j+1)^{th}$ bandwidth allocation mode, j is greater than or equal to o and less than d, and d is a quantity of bandwidth allocation modes that satisfy the $k^{th}$ request; and
wherein Formula 2 represents that a sum of bandwidths corresponding to the plurality of comprehensive allocation modes is less than or equal to the bandwidth currently provided by the first port, r(k, j) represents the $(j+1)^{th}$ bandwidth allocation mode of the $k^{th}$ request, and R represents the bandwidth currently provided by the first port.

3. The method according to claim 1, wherein determining, by the control device, the policy violation degree for each comprehensive allocation mode of the plurality of comprehensive allocation modes based on the bandwidth allocation policy group comprising the plurality of bandwidth allocation policies, to obtain the plurality of policy violation degrees, comprises:
obtaining, by the control device based on a first comprehensive allocation mode in the plurality of comprehensive allocation modes, a quantity of violations of each bandwidth allocation policy in the plurality of bandwidth allocation policies;
calculating, by the control device by using a Formula 3, and based on the quantity of violations of each bandwidth allocation policy in the plurality of bandwidth allocation policies and a weight value of each bandwidth allocation policy in the plurality of bandwidth allocation policies, a policy violation degree corresponding to the first comprehensive allocation mode, wherein the policy violation degree corresponding to the first comprehensive allocation mode is a sum of products of the quantity of violations of each bandwidth allocation policy in the plurality of bandwidth allocation policies and the weight value of each bandwidth allocation policy in the plurality of bandwidth allocation policies; and
determining, by the control device based on the obtained policy violation degree corresponding to the first comprehensive allocation mode, a policy violation degree corresponding to each comprehensive allocation mode of the plurality of comprehensive allocation modes, to obtain the plurality of policy violation degrees; and wherein Formula 3 is as follows:

$$\Sigma_x^L (W(x) \times Y(x)) \quad \text{Formula 3}$$

wherein W(x) represents a weight value of a bandwidth allocation policy x, Y(x) represents a quantity of violations of the bandwidth allocation policy x, and L represents a quantity of the plurality of bandwidth allocation policies.

4. The method according to claim 3, wherein determining, by the control device, the selected comprehensive allocation mode from the plurality of comprehensive allocation modes based on the plurality of policy violation degrees comprises:
after determining a bandwidth allocation policy whose quantity of violations is greater than or equal to a second threshold, adjusting, by the control device, weight values of the bandwidth allocation policies of the plurality of bandwidth allocation policies;

determining, by the control device, an adjusted policy violation degree for each of the comprehensive allocation modes of the plurality of comprehensive allocation modes based on adjusted weight values of the plurality of bandwidth allocation policies, to obtain a plurality of adjusted policy violation degrees; and determining, by the control device, the selected comprehensive allocation mode from the plurality of comprehensive allocation modes based on the plurality of adjusted policy violation degrees.

5. The method according to claim 1, wherein determining, by the control device, the selected comprehensive allocation mode from the plurality of comprehensive allocation modes based on the plurality of policy violation degrees comprises:

selecting, by the control device from the plurality of policy violation degrees, a comprehensive allocation mode corresponding to a policy violation degree that is less than or equal to a first threshold as the selected comprehensive allocation mode.

6. The method according to claim 1, wherein determining, by the control device, the selected comprehensive allocation mode from the plurality of comprehensive allocation modes based on the plurality of policy violation degrees comprises:

selecting, by the control device, a comprehensive allocation mode corresponding to a minimum policy violation degree in the plurality of policy violation degrees as the selected comprehensive allocation mode.

7. The method according to claim 1, wherein the bandwidth required by the first service and the bandwidth required by the second service each are a bandwidth of a same private line of the first port, and determining, by the control device based on the bandwidth currently provided by the first port, the bandwidth required by the first service, and the bandwidth required by the second service, that a bandwidth occupation conflict exists between the first request and the second request comprises:

determining, by the control device, that the bandwidth of the same private line of the first port is less than a sum of the bandwidth required by the first service and the bandwidth required by the second service.

8. The method according to claim 1, wherein the bandwidth required by the first service and the bandwidth required by the second service are bandwidths of different private lines of the first port, and determining, by the control device based on the bandwidth currently provided by the first port, the bandwidth required by the first service, and the bandwidth required by the second service, that a bandwidth occupation conflict exists between the first request and the second request comprises:

determining, by the control device, that an available bandwidth that can be provided by the first port is less than a sum of the bandwidth required by the first service and the bandwidth required by the second service.

9. A control device, comprising:
a processor; and
a non-transitory computer-readable storage medium coupled to the processor and storing programming instructions for execution by the processor, the programming instructions instructing the processor to:
obtain a first request and a second request, wherein the first request comprises a bandwidth required by a first service, the second request comprises a bandwidth required by a second service, and the bandwidth required by the first service and the bandwidth required by the second service are to be provided by a same port;

determine, based on a bandwidth currently provided by a first port, the bandwidth required by the first service, and the bandwidth required by the second service, that a bandwidth occupation conflict exists between the first request and the second request;

determine at least one first service allocation mode based on the bandwidth provided by the port and the bandwidth required by the first service;

determine at least one second service allocation mode based on the bandwidth provided by the port and the bandwidth required by the second service;

determine a plurality of comprehensive allocation modes for the first service and the second service based on the at least one first service allocation mode and the at least one second service allocation mode;

determine a policy violation degree for each comprehensive allocation mode of the plurality of comprehensive allocation modes based on a bandwidth allocation policy group comprising a plurality of bandwidth allocation policies, to obtain a plurality of policy violation degrees;

determine a selected comprehensive allocation mode from the plurality of comprehensive allocation modes based on the plurality of policy violation degrees; and configure or adjust a policy used by a forwarding device based on the selected comprehensive allocation mode.

10. The control device according to claim 9, wherein the programming instructions instruct the processor to:

select, from the at least one first service allocation mode and the at least one second service allocation mode, an $i_1^{th}$ allocation mode, an $i_2^{th}$ allocation mode, and an $i_3^{th}$ allocation mode that satisfy a Formula 1 and a Formula 2, wherein the $i_1^{th}$ allocation mode, the $i_2^{th}$ allocation mode, and the $i_3^{th}$ allocation mode at least comprise a first service allocation mode of the at least one first service allocation mode and a second service allocation mode of the at least one second service allocation mode; and determine the plurality of comprehensive allocation modes for the first service and the second service based on the $i_1^{th}$ allocation mode, the $i_2^{th}$ allocation mode, and the $i_3^{th}$ allocation mode;

wherein Formula 1 and Formula 2 are as follow:

$$\Sigma_j X(k,j)=1 \qquad \text{Formula 1, and}$$

$$\Sigma_{k=1}^{2} X(k,j)r(k,j) \leq R \qquad \text{Formula 2}$$

wherein $\Sigma_j X(k, j)=1$ represents that a $k^{th}$ request uses a $(j+1)^{th}$ bandwidth allocation mode, j is greater than or equal to o and less than d, and d is a quantity of bandwidth allocation modes that satisfy the $k^{th}$ request;

wherein Formula 2 represents that a sum of bandwidths corresponding to the plurality of comprehensive allocation modes is less than or equal to the bandwidth currently provided by the first port, r(k, j) in Formula 2 represents the $(j+1)^{th}$ bandwidth allocation mode of the $k^{th}$ request, and R represents the bandwidth currently provided by the first port.

11. The control device according to claim 9, wherein the programming instructions instruct the processor to:

obtain, based on a first comprehensive allocation mode in the plurality of comprehensive allocation modes, a quantity of violations of each bandwidth allocation policy in the plurality of bandwidth allocation policies;

calculate, by using a Formula 3 and based on the quantity of violations of each bandwidth allocation policy in the plurality of bandwidth allocation policies and a weight value of each bandwidth allocation policy in the plurality of bandwidth allocation policies, a policy violation degree corresponding to the first comprehensive allocation mode, wherein the policy violation degree corresponding to the first comprehensive allocation mode is a sum of products of the quantity of violations of each bandwidth allocation policy in the plurality of bandwidth allocation policies and the weight value of each bandwidth allocation policy in the plurality of bandwidth allocation policies; and determine, based on the obtained policy violation degree corresponding to the first comprehensive allocation mode, a policy violation degree corresponding to each comprehensive allocation mode of the plurality of comprehensive allocation modes, to obtain the plurality of policy violation degrees;

wherein Formula 3 is as follows:

$$\Sigma_x^L(W(x) \times Y(x)) \quad \text{Formula 3; and}$$

wherein W(x) in represents a weight value of a bandwidth allocation policy x, Y(x) represents a quantity of violations of the bandwidth allocation policy x, and L represents a quantity of the plurality of bandwidth allocation policies; and.

12. The control device according to claim 9, wherein the programming instructions instruct the processor to:
select, from the plurality of policy violation degrees, a comprehensive allocation mode corresponding to a policy violation degree that is less than or equal to a first threshold as the selected comprehensive allocation mode.

13. The control device according to claim 9, wherein the programming instructions instruct the processor to:
select a comprehensive allocation mode corresponding to a minimum policy violation degree in the plurality of policy violation degrees as the selected comprehensive allocation mode.

14. The control device according to claim 9, wherein the programming instructions instruct the processor to:
after determining a bandwidth allocation policy whose quantity of violations is greater than or equal to a second threshold, adjust weight values of the plurality of bandwidth allocation policies;
determine an adjusted policy violation degree for each comprehensive allocation mode of the plurality of comprehensive allocation modes based on adjusted weight values of the plurality of bandwidth allocation policies, to obtain a plurality of adjusted policy violation degrees; and
determine the selected comprehensive allocation mode from the plurality of comprehensive allocation modes based on the plurality of adjusted policy violation degrees.

15. The control device according to claim 9, wherein the bandwidth required by the first service and the bandwidth required by the second service each are a bandwidth of a same private line of the first port, and the programming instructions instruct the processor to determine that the bandwidth occupation conflict exists between the first request and the second request when the bandwidth of the same private line of the first port is less than a sum of the bandwidth required by the first service and the bandwidth required by the second service.

16. The control device according to claim 9, wherein the bandwidth required by the first service and the bandwidth required by the second service are bandwidths of different private lines of the first port, and the programming instructions instruct the processor to determine that the bandwidth occupation conflict exists between the first request and the second request when the bandwidth of the same private line of the first port is less than a sum of the bandwidth required by the first service and the bandwidth required by the second service.

17. A non-transitory computer readable storage medium storing a program executable by at least one processor, the program including instructions for:
obtaining a first request and a second request, wherein the first request comprises a bandwidth required by a first service, the second request comprises a bandwidth required by a second service, and the bandwidth required by the first service and the bandwidth required by the second service are to be provided by a same port;
determining, based on a bandwidth currently provided by a first port, the bandwidth required by the first service, and the bandwidth required by the second service, that a bandwidth occupation conflict exists between the first request and the second request;
determining at least one first service allocation mode based on the bandwidth currently provided by the first port and the bandwidth required by the first service;
determining at least one second service allocation mode based on the bandwidth currently provided by the first port and the bandwidth required by the second service;
determining a plurality of comprehensive allocation modes for the first service and the second service based on the at least one first service allocation mode and the at least one second service allocation mode;
determining a policy violation degree for each comprehensive allocation mode of the plurality of comprehensive allocation modes based on a bandwidth allocation policy group comprising a plurality of bandwidth allocation policies, to obtain a plurality of policy violation degrees;
determining a selected comprehensive allocation mode from the plurality of comprehensive allocation modes based on the plurality of policy violation degrees; and
configuring or adjusting a policy used by a forwarding device based on the selected comprehensive allocation mode.

18. A non-transitory computer readable storage medium according to claim 17, wherein determining the plurality of comprehensive allocation modes for the first service and the second service based on the at least one first service allocation mode and the at least one second service allocation mode comprises:
selecting, from the at least one first service allocation mode and the at least one second service allocation mode, an $i_1^{th}$ allocation mode, an $i_2^{th}$ allocation mode, and an $i_3^{th}$ allocation mode that satisfy a Formula 1 and a Formula 2, wherein the $i_1^{th}$ allocation mode, the $i_2^{th}$ allocation mode, and the $i_3^{th}$ allocation mode comprise at least a first service allocation mode of the at least one first service allocation mode and a second service allocation mode of the at least one second service allocation mode; and
determining the plurality of comprehensive allocation modes for the first service and the second service based on the $i_1^{th}$ allocation mode, the $i_2^{th}$ allocation mode, and the $i_3^{th}$ allocation mode; and wherein Formula 1 and Formula 2 are as follows:

$$\Sigma_j X(k,j)=1 \qquad \text{Formula 1, and}$$

$$\Sigma_{k=1}^{2} X(k,j) r(k,j) \leq R \qquad \text{Formula 2}$$

wherein $\Sigma_j X(k, j)=1$ in represents that a $k^{th}$ request uses a $(j+1)^{th}$ bandwidth allocation mode, j is greater than or equal to o and less than d, and d is a quantity of bandwidth allocation modes that satisfy the $k^{th}$ request; and wherein Formula 2 represents that a sum of bandwidths corresponding to the plurality of comprehensive allocation modes is less than or equal to the bandwidth currently provided by the first port, r(k, j) represents the $(j+1)^{th}$ bandwidth allocation mode of the $k^{th}$ request, and R represents the bandwidth currently provided by the first port.

19. The non-transitory computer readable storage medium according to claim 17, wherein determining the policy violation degree for each comprehensive allocation mode of the plurality of comprehensive allocation modes based on the bandwidth allocation policy group comprising the plurality of bandwidth allocation policies, to obtain the plurality of policy violation degrees, comprises:

obtaining, based on a first comprehensive allocation mode in the plurality of comprehensive allocation modes, a quantity of violations of each bandwidth allocation policy in the plurality of bandwidth allocation policies;

calculating, by using a Formula 3, and based on the quantity of violations of each bandwidth allocation policy in the plurality of bandwidth allocation policies and a weight value of each bandwidth allocation policy in the plurality of bandwidth allocation policies, a policy violation degree corresponding to the first comprehensive allocation mode, wherein the policy violation degree corresponding to the first comprehensive allocation mode is a sum of products of the quantity of violations of each bandwidth allocation policy in the plurality of bandwidth allocation policies and the weight value of each bandwidth allocation policy in the plurality of bandwidth allocation policies; and determining, based on the obtained policy violation degree corresponding to the first comprehensive allocation mode, a policy violation degree corresponding to each comprehensive allocation mode of the plurality of comprehensive allocation modes, to obtain the plurality of policy violation degrees; and wherein Formula 3 is as follows:

$$\Sigma_x^{L}(W(x) \times Y(x)) \qquad \text{Formula 3,}$$

wherein W(x) represents a weight value of a bandwidth allocation policy x, Y(x) represents a quantity of violations of the bandwidth allocation policy x, and L represents a quantity of the plurality of bandwidth allocation policies.

\* \* \* \* \*

UNITED STATES PATENT AND TRADEMARK OFFICE
CERTIFICATE OF CORRECTION

Page 1 of 1

PATENT NO. : 11,265,221 B2
APPLICATION NO. : 17/120904
DATED : March 1, 2022
INVENTOR(S) : Bai et al.

It is certified that error appears in the above-identified patent and that said Letters Patent is hereby corrected as shown below:

In the Claims

Claim 11, Column 27, Line 1; delete "$_3$" and insert -- 3 --.

Signed and Sealed this
Twenty-ninth Day of March, 2022

Drew Hirshfeld
*Performing the Functions and Duties of the*
*Under Secretary of Commerce for Intellectual Property and*
*Director of the United States Patent and Trademark Office*